(12) United States Patent
Kamatani et al.

(10) Patent No.: US 9,987,947 B2
(45) Date of Patent: Jun. 5, 2018

(54) POWER SUPPLY APPARATUS OF VEHICLE

(71) Applicant: TOYOTA JIDOSHA KABUSHIKI KAISHA, Toyota-shi, Aichi-ken (JP)

(72) Inventors: Hideki Kamatani, Nagoya (JP); Suguru Kumazawa, Toyota (JP); Ryoji Sato, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 35 days.

(21) Appl. No.: 15/107,953

(22) PCT Filed: Nov. 20, 2014

(86) PCT No.: PCT/JP2014/005842
§ 371 (c)(1),
(2) Date: Jun. 24, 2016

(87) PCT Pub. No.: WO2015/104744
PCT Pub. Date: Jul. 16, 2015

(65) Prior Publication Data
US 2016/0318416 A1    Nov. 3, 2016

(30) Foreign Application Priority Data
Jan. 9, 2014   (JP) .................................. 2014-002346

(51) Int. Cl.
*B60W 20/00* (2016.01)
*B60L 11/18* (2006.01)
(Continued)

(52) U.S. Cl.
CPC ......... *B60L 11/1861* (2013.01); *B60L 3/0046* (2013.01); *B60L 11/02* (2013.01);
(Continued)

(58) Field of Classification Search
CPC ................. B60W 20/00; B60W 10/08; B60W 2510/244; B60L 11/1861; B60L 3/0046;
(Continued)

(56) References Cited

U.S. PATENT DOCUMENTS

| 2011/0082611 | A1  | 4/2011  | Shiba |
| 2011/0307132 | A1* | 12/2011 | Hashimoto ............ B60K 6/445 701/22 |
| 2012/0049774 | A1* | 3/2012  | Takamatsu .......... B60L 11/1803 318/400.3 |

FOREIGN PATENT DOCUMENTS

| JP | 2010-11651  | 1/2010  |
| JP | 2011-15603  | 1/2011  |
| JP | 2012-222907 | 11/2012 |

* cited by examiner

*Primary Examiner* — Dalena Tran
(74) *Attorney, Agent, or Firm* — Finnegan, Henderson, Farabow, Garrett & Dunner, LLP (57) ABSTRACT

A power supply apparatus of a vehicle includes: an engine and a first MG; a battery; a converter stepping up a voltage of the battery and supplying the stepped-up voltage to an inverter of the vehicle; and a control device controlling the converter in a continuous voltage step-up mode in which the converter is continuously operated and an intermittent voltage step-up mode in which the converter is intermittently operated. The control device estimates an SOC of the battery based on battery current IB flowing into and out of the battery, and forces the battery to be charged by the engine and the first MG when an estimate value of the SOC is lower than a predetermined lower limit. The control device suppresses an operation of the converter in the intermittent voltage step-up mode to a greater extent as the estimate value of the SOC is closer to the lower limit.

5 Claims, 7 Drawing Sheets (51) Int. Cl.
  *B60L 3/00* (2006.01)
  *B60L 11/02* (2006.01)
  *B60K 6/442* (2007.10)

(52) U.S. Cl.
  CPC .......... *B60L 11/1862* (2013.01); *B60W 20/00* (2013.01); *B60K 6/442* (2013.01); *B60L 2210/10* (2013.01); *B60L 2240/54* (2013.01); *B60W 2710/00* (2013.01); *B60Y 2400/20* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7216* (2013.01); *Y10S 903/903* (2013.01)

(58) Field of Classification Search
  CPC .. B60L 11/02; B60L 2210/10; Y10S 903/903; B60Y 2400/20
  USPC ...... 701/22; 180/65.28, 65.21, 65.29, 65.265
  See application file for complete search history.

POWER SUPPLY APPARATUS OF VEHICLE

CROSS-REFERENCE TO RELATED APPLICATIONS

This application is a national phase application of International Application No. PCT/JP2014/005842, filed Nov. 20, 2014, and claims the priority of Japanese Application No. 2014-002346, filed Jan. 9, 2014, the content of both of which is incorporated herein by reference.

TECHNICAL FIELD

The present invention relates to a power supply apparatus of a vehicle.

BACKGROUND ART

A power supply system of a hybrid vehicle is known that steps up a low output voltage from a battery by a voltage step-up converter and supplies electric power of the high stepped-up voltage to a motor generator. Regarding such a power supply system, a technique of reducing an electric power loss of the voltage step-up converter has been proposed.

For example, a hybrid vehicle disclosed in Japanese Patent Laying-Open No. 2010-11651 (PTL 1) includes first and second batteries, a first voltage step-up converter converting an output voltage of the first battery to output the converted voltage to a motor generator, and a second voltage step-up converter converting an output voltage of the second battery to output the converted voltage to the motor generator. While controlling the vehicle in a hybrid travel mode, a control device of this hybrid vehicle operates the first voltage step-up converter while stopping the second voltage step-up converter. In this way, an electric power loss of the second voltage step-up converter is reduced and accordingly fuel economy can be improved.

CITATION LIST

Patent Literature

PTL 1: Japanese Patent Laying-Open No. 2010-11651
PTL 2: Japanese Patent Laying-Open No. 2012-222907
PTL 3: Japanese Patent Laying-Open No. 2011-15603

SUMMARY OF INVENTION

Technical Problem

In the case where electric current consumption of a motor generator is small, intermittent voltage step-up control may be performed by intermittently operating and stopping a voltage step-up converter to thereby reduce an electric power loss due to switching of the voltage step-up converter. In the case where this control is performed, current flowing through the voltage step-up converter and current flowing from/into a battery (battery current) are also quickly switched between a state of being flown and a state of not being flown.

Depending on the configuration of an ECU (Electronic Control Unit) which performs vehicle control, data of electric current used for the control may be measured in slow cycles, resulting in a failure to be able to precisely observe changes of the electric current.

More specifically, the ECU can use a method of estimating the SOC (State Of Charge) of a battery by integrating battery current. In the case where this estimation method is used under the intermittent voltage step-up control, changes of the battery current cannot precisely be observed, and therefore, the precision with which the SOC is estimated is lowered. The lowered precision with which the SOC is estimated may cause the estimate value of the SOC to deviate from a true value. Accordingly, the battery may be forced to be charged regardless of the fact that actually the battery charging is unnecessary. In such a case, fuel economy may be deteriorated.

An object of the present invention is to provide a power supply apparatus of a vehicle that is capable of ensuring an effect of reducing an electric power loss by the intermittent voltage step-up control and still capable of preventing the fuel economy from being deteriorated.

Solution to Problem

A power supply apparatus of a vehicle according to an aspect of the present invention includes: a power generation unit; a power storage device; a voltage step-up converter stepping up a voltage of the power storage device and supplying the stepped-up voltage to an electrical load of the vehicle; and a control device controlling the voltage step-up converter in a continuous voltage step-up mode and an intermittent voltage step-up mode. In the continuous voltage step-up mode the converter is continuously operated. In the intermittent voltage step-up mode the converter is intermittently operated. The control device estimates a state of charge of the power storage device based on current flowing into and out of the power storage device, and forces the power storage device to be charged by the power generation unit when an estimate value of the state of charge is lower than a predetermined lower limit. The control device suppresses an operation of the voltage step-up converter in the intermittent voltage step-up mode to a greater extent as the estimate value is closer to the lower limit.

According to the above-described features, the operation in the intermittent voltage step-up mode is suppressed to a greater extent as the estimate value of the state of charge is closer to the lower limit. Therefore, even in the case where the precision with which the state of charge is estimated is low, the control device can be prevented from erroneously determining that the estimate value is smaller than the lower limit. Thus, forced charging of the power storage device that is actually unnecessary can be prevented from being done and accordingly deterioration of fuel economy can be suppressed.

Preferably, the control device suppresses the operation of the voltage step-up converter in the intermittent voltage step-up mode, in a case where the estimate value is equal to or smaller than a predetermined threshold value larger than the lower limit.

According to the above-described features, the threshold value can be set to thereby suppress the operation in the intermittent voltage step-up mode when the estimate value is in the range between the lower limit and the threshold value.

Preferably, the threshold value is determined so that the threshold value is larger than the lower limit by a maximum error of the estimate value that can be caused by the operation of the voltage step-up converter in the intermittent voltage step-up mode.

According to the above-described features, the threshold value is set with a margin of a maximum error of the estimate value from the lower limit. Thus, forced charging which is actually unnecessary can more reliably be prevented from being done.

Preferably, the control device suppresses the operation of the voltage step-up converter by inhibiting the operation of the voltage step-up converter in the intermittent voltage step-up mode.

According to the above-described features, the operation in the intermittent voltage step-up mode is inhibited. Therefore, as compared with the case where the intermittent voltage step-up mode is suppressed, the control device can reliably be prevented from erroneously determining that the estimate value is smaller than the lower limit.

Preferably, the control device suppresses the operation of the voltage step-up converter by reducing a rate at which the voltage of the power storage device is stepped up in the intermittent voltage step-up mode.

According to the above-described features, the reduction of the rate at which the voltage of the power storage device is stepped up causes the battery current to increase gently. Therefore, as compared with the case where the rate at which the voltage is stepped up is larger, the battery current is averaged over time. Thus, the variation of the value of the battery current depending on the timing at which the current is measured can be reduced and therefore the precision with which the state of charge of the power storage device is estimated can be improved. Accordingly, forced charging of the power storage device which is actually unnecessary can be prevented from being done. In addition, a power loss of the voltage step-up converter due to forced charging can be reduced.

Preferably, the control device suppresses the operation of the voltage step-up converter by limiting, to a predetermined value or less, current flowing through the voltage step-up converter in the intermittent voltage step-up mode.

According to the above-described features, the limitation of the current flowing through the voltage step-up converter enables the battery current to be limited. The battery current thus increases gently. As compared with the case where the rate at which the voltage is stepped up is larger, the battery current is averaged over time. Thus, the variation of the value of the battery current depending on the timing at which the current is measured can be reduced and therefore the precision with which the state of charge of the power storage device is estimated can be improved. Accordingly, forced charging of the power storage device which is actually unnecessary can be prevented from being done.

Advantageous Effects of Invention

In accordance with the present invention, an effect of reducing an electric power loss by the intermittent voltage step-up control can be ensured and the fuel economy can still be prevented from being deteriorated.

DESCRIPTION OF EMBODIMENTS

Embodiments of the present invention will hereinafter be described in detail with reference to the drawings. In the drawings, the same or corresponding parts are denoted by the same reference characters, and a description thereof will not be repeated.

First Embodiment

Figure 1:
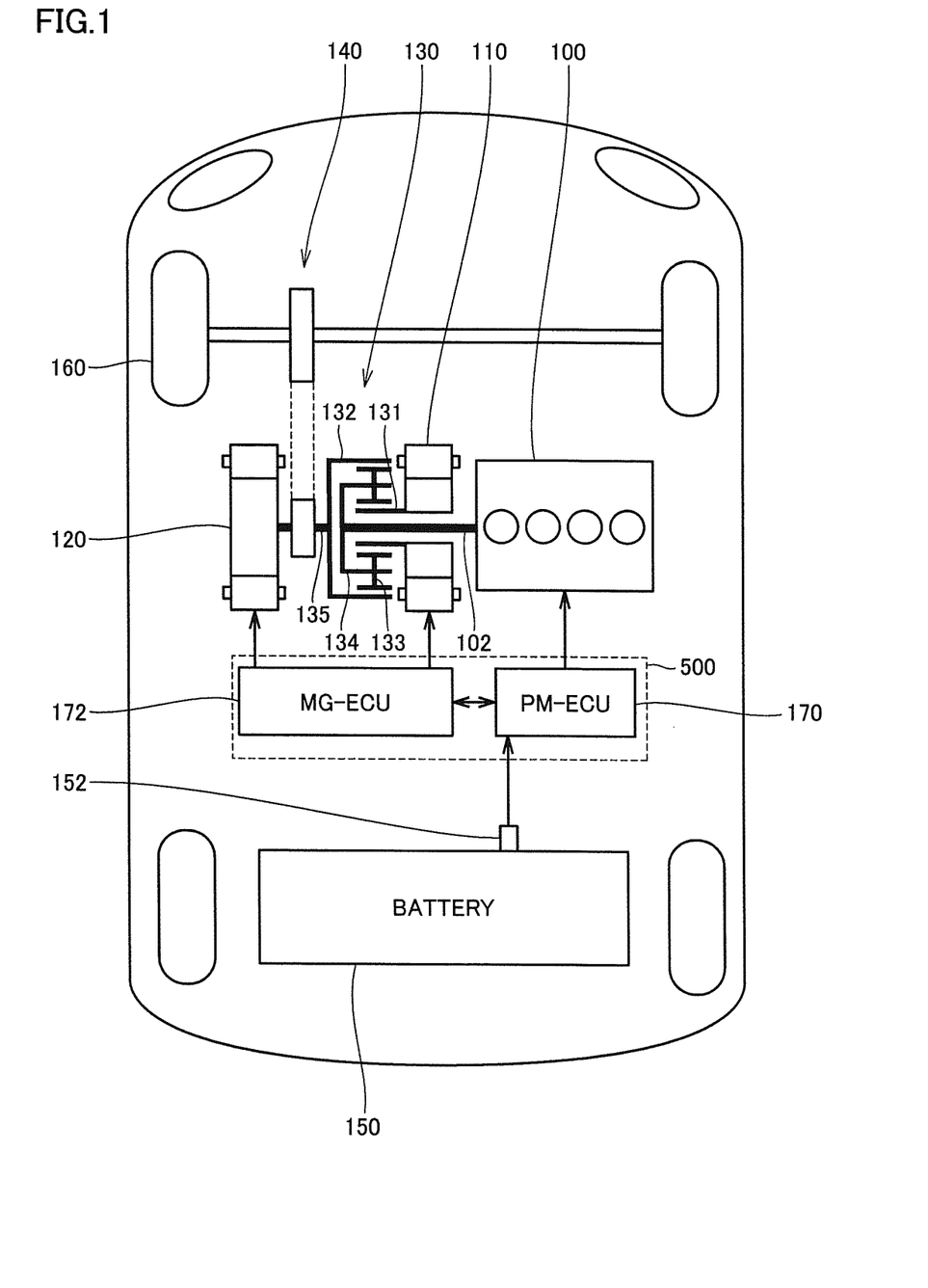
FIG. 1 is a block diagram for illustrating an example configuration of a hybrid vehicle shown as a typical example of the electrically powered vehicle according to an embodiment of the present invention.

FIG. 1 is a block diagram for illustrating an example configuration of a hybrid vehicle shown as a typical example of the electrically powered vehicle according to an embodiment of the present invention.

Referring to FIG. 1, the hybrid vehicle includes an engine 100, a first MG (Motor Generator) 110, a second MG 120, a power split device 130, a reduction gear 140, a battery 150, drive wheels 160, and a control device 500. Control device 500 is configured to include a PM (Power Management)-ECU (Electronic Control Unit) 170 and an MG-ECU 172.

The hybrid vehicle is caused to run by a drive force from at least one of engine 100 and second MG 120. Engine 100, first MG 110, and second MG 120 are coupled to each other through power split device 130.

Power split device 130 is typically configured as a planetary gear mechanism. Power split device 130 includes a sun gear 131 which is an externally-toothed gear, a ring gear 132 which is an internally-toothed gear arranged concentrically with sun gear 131, a plurality of pinion gears 133 meshing with sun gear 131 and with ring gear 132, and a carrier 134. Carrier 134 is configured to hold a plurality of pinion gears 133 so that they can rotate on respective axes and also revolve.

Power split device 130 splits motive power generated by engine 100 into two paths. One is a path for driving drive wheels 160 through reduction gear 140. The other is a path for generating electric power by driving first MG 110.

First MG 110 and second MG 120 are each typically a three-phase AC rotating electric machine configured in the form of a permanent-magnet motor.

First MG 110 mainly operates as "electric generator" and is capable of generating electric power from a drive force which is supplied from engine 100 and split by power split device 130. Namely, engine 100 and first MG 110 correspond to "power generation unit." The electric power generated by first MG 110 is used differently depending on the condition in which the vehicle is running and the condition of the SOC (State Of Charge) of battery 150. Regarding this electric power, its voltage is thereafter adjusted by a converter, which will be described later herein, and stored in battery 150. In the case for example where engine 100 is motored when the engine is started, first MG 110 can also operate as an electric motor as a result of torque control.

Second MG 120 mainly operates as "electric motor" and is driven by means of at least one of the electric power stored in battery 150 and the electric power generated by first MG 110. The motive power generated by second MG 120 is transmitted to a driveshaft 135 and further transmitted through reduction gear 140 to drive wheels 160. Thus, second MG 120 assists engine 100 or causes the vehicle to run by the drive force from second MG 120.

When the hybrid vehicle is regeneratively braked, second MG 120 is driven by drive wheels 160 through reduction gear 140. In this case, second MG 120 operates as an electric generator. Thus, second MG 120 serves as a regenerative brake converting braking energy into electric power. The electric power generated by second MG 120 is stored in battery 150.

Battery 150 is a battery pack made up of a plurality of battery modules connected in series, the battery modules each being made up of a plurality of battery cells integrated into the battery module. The voltage of battery 150 is approximately 200 V for example. Battery 150 can be charged with electric power generated by first MG 110 or second MG 120. The temperature, the voltage, and the current of battery 150 are detected by a battery sensor 152. A temperature sensor, a voltage sensor, and a current sensor are herein collectively referred to as battery sensor 152.

PM-ECU 170 and MG-ECU 172 are each configured to have a CPU (Central Processing Unit) and a memory (not shown) incorporated therein, and configured to perform operations based on values detected respectively by the sensors, through software processing in accordance with a map and a program stored in the memory. Alternatively, at least a part of PM-ECU 170 and MG-ECU 172 may be configured to perform a predetermined mathematical operation and/or a predetermined logical operation through hardware processing by a dedicated electronic circuit or the like.

Engine 100 is controlled in accordance with an operational command value from PM-ECU 170. First MG 110, second MG 120, converter 200, and inverters 210, 220 are controlled by MG-ECU 172. PM-ECU 170 and MG-ECU 172 are connected to each other so that they can bidirectionally communicate with each other.

Although PM-ECU 170 and MG-ECU 172 are configured as separate ECUs in the present embodiment, a single ECU incorporating respective functions of these ECUs may be provided.

Figure 2:
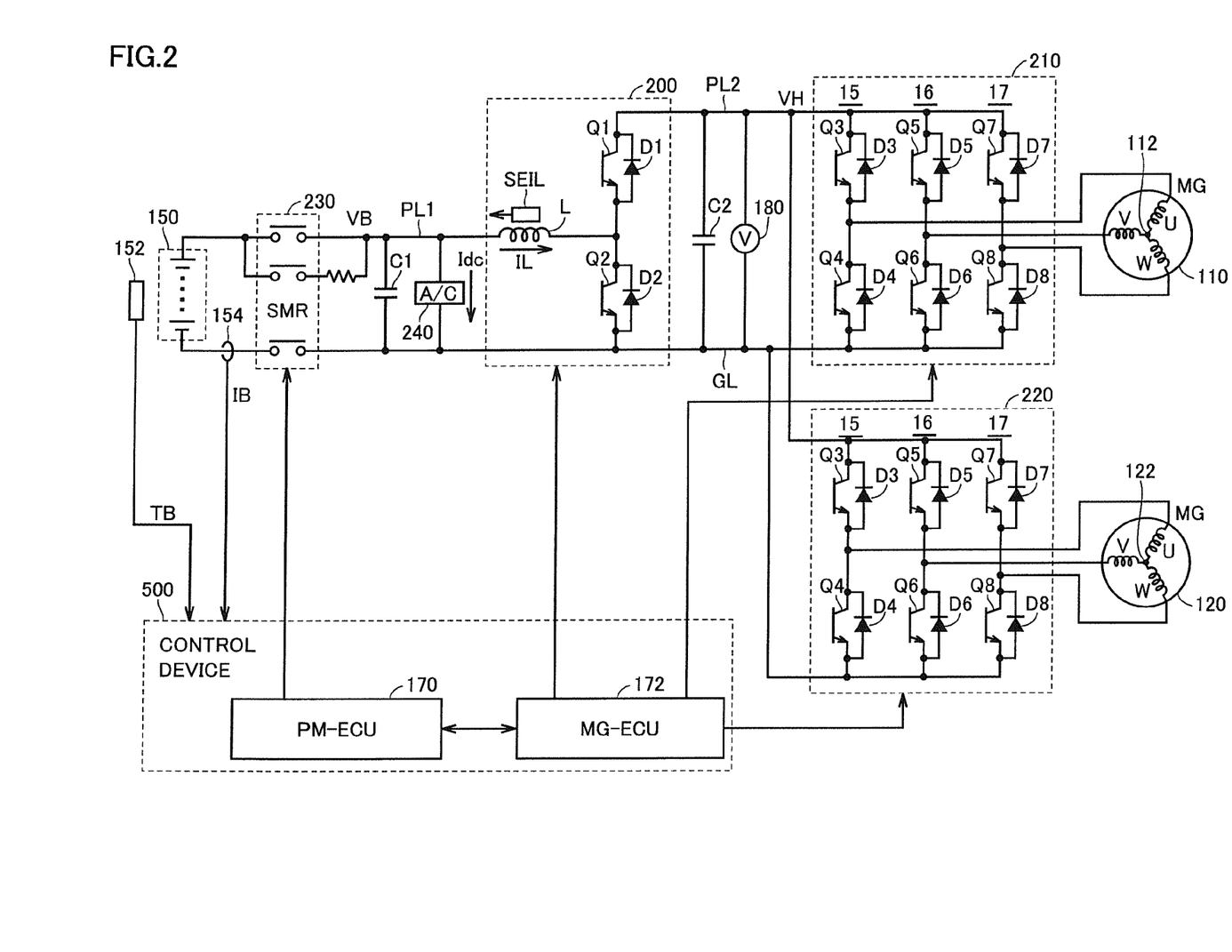
FIG. 2 is a circuit diagram illustrating an example configuration of an electrical system of the hybrid vehicle shown in FIG. 1.

FIG. 2 is a circuit diagram illustrating an example configuration of an electrical system of the hybrid vehicle shown in FIG. 1.

Referring to FIG. 2, the electrical system of the hybrid vehicle includes converter 200 (voltage step-up converter), inverter 210 associated with first MG 110, inverter 220 associated with second MG 120, an SMR (System Main Relay) 230, and capacitors C1, C2.

Converter 200 includes two power semiconductor switching elements Q1, Q2 (also referred to simply as "switching element" hereinafter) connected in series, diodes D1, D2 provided in association with switching elements Q1, Q2, respectively, and a reactor L.

Switching elements Q1, Q2 are connected in series between a positive line PL2 and a ground line GL which is connected to a negative electrode of battery 150. The collector of switching element Q1 is connected to positive line PL2 and the emitter of switching element Q2 is connected to ground line GL. Diodes D1, D2 are connected in anti-parallel with switching elements Q1, Q2, respectively. Switching element Q1 and diode D1 constitute an upper arm of converter 200 and switching element Q2 and diode D2 constitute a lower arm of converter 200.

As power semiconductor switching elements Q1, Q2, any of IGBT (Insulated Gate Bipolar Transistor), power MOS (Metal Oxide Semiconductor) transistor, power bipolar transistor and the like can appropriately be used. ON/OFF of each of switching elements Q1, Q2 is controlled by a switching control signal from MG-ECU 172.

Reactor L has one end connected to a positive line PL1 which is connected to a positive electrode of battery 150, and the other end connected to a connection node of switching elements Q1, Q2, namely a connection point between the emitter of switching element Q1 and the collector of switching element Q2.

Capacitor C2 is connected between positive line PL2 and ground line GL. Capacitor C2 smoothes an AC component of a voltage variation between positive line PL2 and ground line GL. Capacitor C1 is connected between positive line PL1 and ground line GL. Capacitor C1 smoothes an AC component of a voltage variation between positive line PL1 and ground line GL.

Further, an air conditioner (A/C) 240 is connected between positive line PL1 and ground line GL. Although not shown, an auxiliary machine other than air conditioner 240 may also be connected between positive line PL1 and ground line GL. Current supplied to air conditioner 240 and current supplied to the auxiliary machine are collectively expressed as auxiliary machine current Idc.

Current IL flowing in reactor L (hereinafter reactor current) is detected by a current sensor SEIL. A voltage sensor 180 detects a voltage across terminals of capacitor C2 that is an output voltage of converter 200, namely detects a voltage VH (system voltage) between positive line PL2 and ground line GL, and outputs the detected value to MG-ECU 172.

Converter 200, inverter 210, and inverter 220 are electrically connected to each other through positive line PL2 and ground line GL.

In a voltage step-up operation, converter 200 steps up a DC voltage VB (voltage across the opposite terminals of capacitor C1) that is supplied from battery 150, and supplies system voltage VH generated by the voltage step-up to inverters 210, 220. More specifically, in response to a switching control signal from MG-ECU 172, an ON period of switching element Q1 and an ON period of switching element Q2 are alternated, and a voltage step-up ratio is determined depending on a ratio between these ON periods.

In a voltage step-down operation, converter 200 steps down system voltage VH which is supplied through capacitor C2 from inverters 210, 220 to charge battery 150 with the voltage. More specifically, in response to a switching control signal from MG-ECU 172, a period in which only switching element Q1 is ON and a period in which both switching elements Q1, Q2 are OFF are alternated, and a voltage step-down ratio is determined depending on the duty ratio of the ON period.

When the voltage step-up/step-down operation of converter 200 is stopped, switching element Q1 is fixed in an ON state and switching element Q2 is fixed in an OFF state.

Inverter 210 is configured in the form of a common three-phase inverter, and includes a U phase arm 15, a V phase arm 16, and a W phase arm 17. Arms 15 to 17 include switching elements Q3 to Q8 and anti-parallel diodes D3 to D8.

When the vehicle is running, inverter 210 controls current or voltage of each phase coil of first MG 110 so that first MG 110 operates in accordance with an operational command value (typically torque command value) which is set for generating a drive force (vehicle drive torque, electric power generation torque, or the like) required for the vehicle to run. Namely, inverter 210 performs bidirectional DC/AC power conversion between positive line PL2 and first MG 110.

Inverter 220 is configured in the form of a common three-phase inverter, like inverter 210. When the vehicle is running, inverter 220 controls current or voltage of each phase coil of second MG 120 so that second MG 120 operates in accordance with an operational command value (typically torque command value) which is set for generating a drive force (vehicle drive torque, regenerative braking torque, or the like) required for the vehicle to run. Namely, inverter 220 performs bidirectional DC/AC power conversion between positive line PL2 and second MG 120.

PM-ECU 170 calculates a torque command value TR1 for first MG 110 and a torque command value TR2 for second MG 120, based on an accelerator pedal position Acc and a speed V of the hybrid vehicle.

MG-ECU 172 calculates an optimum value (target value) of output voltage (system voltage) VH of converter 200, namely a command voltage VH*, based on torque command value TR1 for first MG 110 and torque command value TR2 for second MG 120 that are calculated by PM-ECU 170 as well as a motor rotational speed MRN1 of first MG 110 and a motor rotational speed MRN2 of second MG 120. MG-ECU 172 calculates, based on output voltage VH of converter 200 that is detected by voltage sensor 180 and command voltage VH*, a duty ratio for controlling output voltage VH so that voltage VH is equal to command voltage VH*, and accordingly controls converter 200.

MG-ECU 172 controls converter 200 by setting the converter in one of a continuous voltage step-up mode and an intermittent voltage step-up mode. The continuous voltage step-up mode is a mode in which converter 200 performs a voltage step-up operation without stopping. The intermittent voltage step-up mode is a mode in which converter 200 intermittently repeats a voltage step-up operation and stoppage of the voltage step-up operation. When converter 200 performs the voltage step-up operation, switching elements Q1, Q2 are switched between an ON state and an OFF state. When converter 200 stops the voltage step-up operation, switching element Q1 is fixed in the ON state and switching element Q2 is fixed in the OFF state.

The fact that converter 200 does not step up the voltage in the continuous voltage step-up mode and the fact that converter 200 stops voltage step-up in the intermittent voltage step-up mode are different from each other in terms of the following respect.

In the continuous voltage step-up mode, the voltage of battery 150 is supplied to inverters 210, 220 through converter 200. Therefore, in the case where converter 200 does not step up the voltage in the continuous voltage step-up mode, the voltage of battery 150 is supplied as it is through converter 200 (duty ratio is 1) to inverters 210, 220 without being stepping up.

In contrast, when converter 200 stops voltage step-up in the intermittent voltage step-up mode, the voltage of battery 150 is not supplied through converter 200 to inverters 210, 220.

Control device 500 (specifically PM-ECU 170) estimates the SOC of battery 150 by integrating battery current IB. Since a common method can be used as the method of estimating the SOC by integration of current, the description is not repeated here. It should be noted, however, that the present embodiment has a feature that battery current IB quickly varies under control in the intermittent voltage step-up mode.

Figure 3:
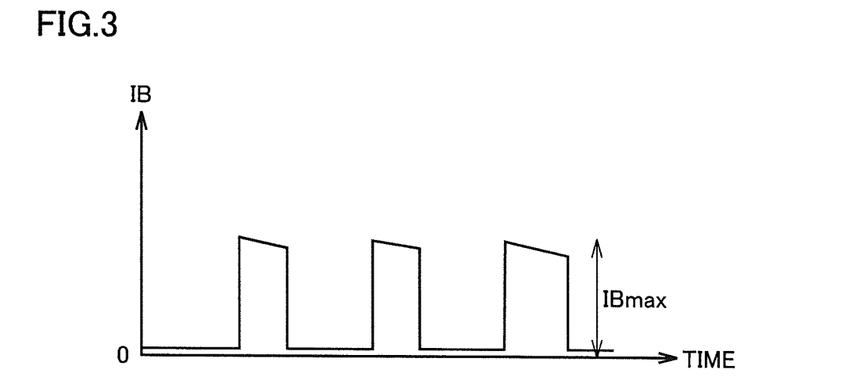
FIG. 3 is a waveform diagram for illustrating battery current IB in the case where a converter 200 is controlled in the intermittent voltage step-up mode.

FIG. 3 is a waveform diagram for illustrating battery current IB in the case where converter 200 is controlled in the intermittent voltage step-up mode. Referring to FIG. 3, while the intermittent voltage step-up control is performed, battery current IB varies in very short cycles (3 to 5 ms for example). In order to accurately observe the current, it is necessary that the cycles in which the current is measured are sufficiently shorter than such cycles in which the current varies.

In order to shorten the cycles in which the current is measured, however, it is necessary to use a high-speed CPU or increase the communication frequency, which causes an increase in cost. In view of this, for control device 500 in the present embodiment, a CPU having control cycles longer than the cycles in which battery current IB varies is used. By way of example, the period of the control cycle of the CPU of control device 500 is approximately 8 ms relative to the period of the cycle of approximately 5 ms in which battery current IB varies.

As seen from the above, in the case where the time intervals at which battery current IB is measured are longer than the intervals at which battery current IB varies, the current cannot accurately be observed and therefore the precision with which battery current IB is measured is lower under control in the intermittent voltage step-up mode. Thus, there is a possibility that the precision with which the SOC is estimated is lower and accordingly the estimate value of the SOC deviates from a true value. Namely, when control device 500 performs control in the intermittent voltage step-up mode, control device 500 controls converter 200 so that battery 150 is charged or discharged based on the SOC estimated with a relatively lower precision.

Figure 4:
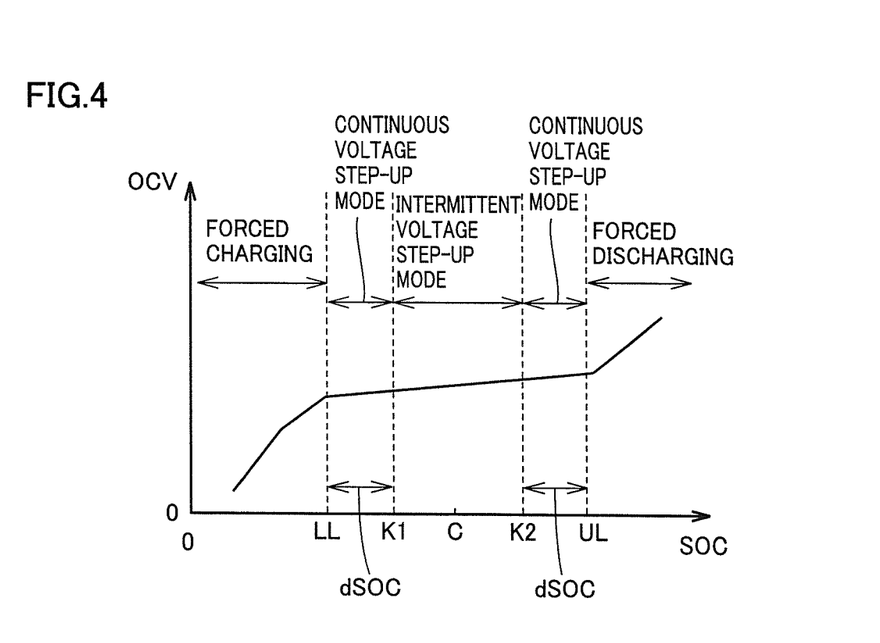
FIG. 4 is a diagram for illustrating control of converter 200 depending on the SOC of a battery 150.

FIG. 4 is a diagram for illustrating control of converter 200 depending on the SOC of battery 150. Referring to FIG. 4, the horizontal axis represents the SOC of battery 150 and the vertical axis represents the open-circuit voltage (OCV) of battery 150.

An upper limit UL and a lower limit LL of the SOC of battery 150 are defined. In the case where the SOC is higher than upper limit UL, voltage VB of battery 150 sharply increases with an increase of the SOC. Therefore, in the case where the SOC is higher than upper limit UL, control device 500 controls converter 200 so that battery 150 is discharged, in order to protect battery 150.

In contrast, in the case where the SOC is lower than lower limit LL, voltage VB of battery 150 sharply decreases with a decrease of the SOC. Therefore, in the case where the SOC is lower than lower limit LL, control device 500 controls converter 200 so that battery 150 is charged. In other words, control device 500 estimates the SOC of battery 150 based on battery current IB flowing into/out of battery 150, and forces battery 150 to be charged by engine 100 and first MG 110 when the estimate value of the SOC is lower than predetermined lower limit LL.

In the following, discharging which is done when the SOC is higher than upper limit UL is referred to as forced discharging and charging which is done when the SOC is lower than lower limit LL is referred to as forced charging.

If the estimate value of the SOC deviates from a true value as mentioned above, it could occur that control device 500 erroneously determines that the estimate value of the SOC is higher than upper limit UL in spite of the fact that the true value of the SOC is sufficiently lower than upper limit UL. In this case, forced discharging is done to cause the SOC to be sharply decreased. As a result, a user may feel abnormal about the fact that the SOC has unnaturally decreased, which is found for example from a change of an indicator which indicates the SOC.

On the contrary, it could also occur that control device 500 erroneously determines that the estimate value of the SOC is lower than lower limit LL in spite of the fact that the true value of the SOC is sufficiently higher than lower limit LL. In this case, forced charging is done to cause engine 100 to be operated. Because the engine 100 is in this case operated based on the erroneous determination, there is a possibility that fuel economy is deteriorated. In addition, because the operation of engine 100 is started at an unintended timing, the user may feel abnormal about this engine's operation.

In view of the above, threshold values K1 and K2 are defined between lower limit LL and upper limit UL. Threshold value K1 is defined between lower limit LL and a central value C, and threshold value K2 is defined between central value C and upper limit UL (K1<C<K2). Central value C is an average of upper limit UL and lower limit LL for example. As long as central value C is a value between upper limit UL and lower limit LL, central value C is not limited to the average.

Further, threshold value K1 is preferably a value determined by adding, to lower limit LL of the SOC, an error dSOC of the SOC that is assumed to occur under control in the intermittent voltage step-up mode. In other words, threshold value K1 is determined so that it is larger than lower limit LL by a maximum error (dSOC) of the estimate value of the SOC that can be caused by the operation of converter 200 in the intermittent voltage step-up mode. Likewise, threshold value K2 is preferably a value determined by subtracting error dSOC from upper limit UL of the SOC. How to determine error dSOC will be detailed later herein.

In the case where the SOC falls within the range defined by threshold values K1 and K2 (in the case where the SOC is threshold value K1 or more and threshold value K2 or less), control in the intermittent voltage step-up mode is permitted. In contrast, in the case where the SOC is out of this range (in the case where the SOC is less than threshold value K1 or more than threshold value K2), control in the intermittent voltage step-up mode is inhibited, namely, control in the continuous voltage step-up mode is executed. In the following, the aforementioned range is also referred to as permission range.

The range of the SOC that is larger than threshold value K1 and equal to or less than central value C is a range which is commonly used as compared with the range thereof that is larger than lower limit LL and equal to or less than threshold value K1. The permission range is thus defined, and accordingly, in the case where the SOC is in the commonly used range, the operation of converter 200 in the intermittent voltage step-up mode is permitted. In contrast, in the case where the SOC is in the range which is not commonly used (the range larger than lower limit LL and equal to or less than threshold value K1), the operation of converter 200 in the intermittent voltage step-up mode is suppressed. Namely, the range of the SOC in which the operation of the voltage step-up converter in the intermittent voltage step-up mode is suppressed can be limited to the range which is not commonly used.

Figure 5:
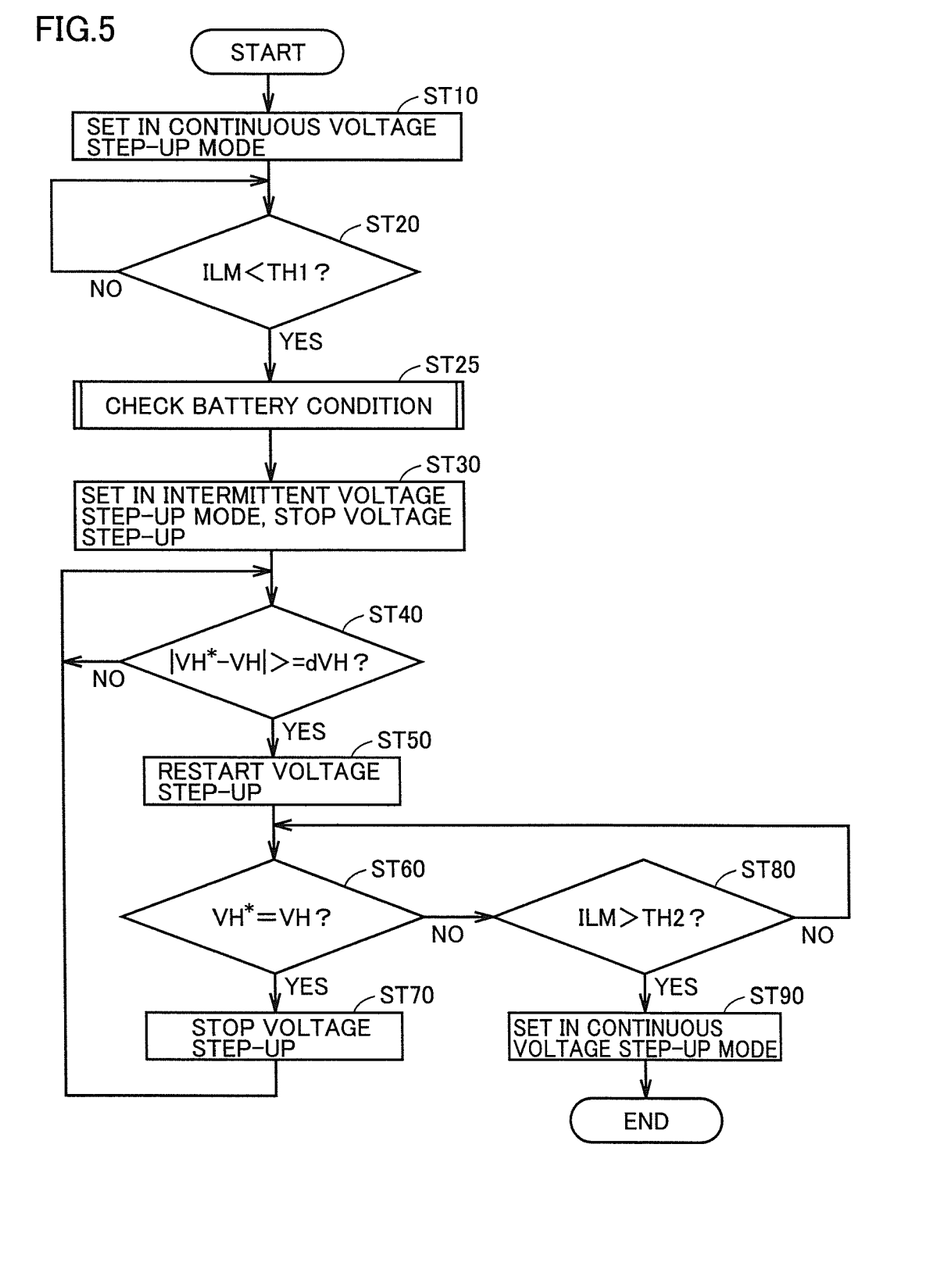
FIG. 5 is a flowchart showing a procedure of voltage step-up control by converter 200.
Figure 7:
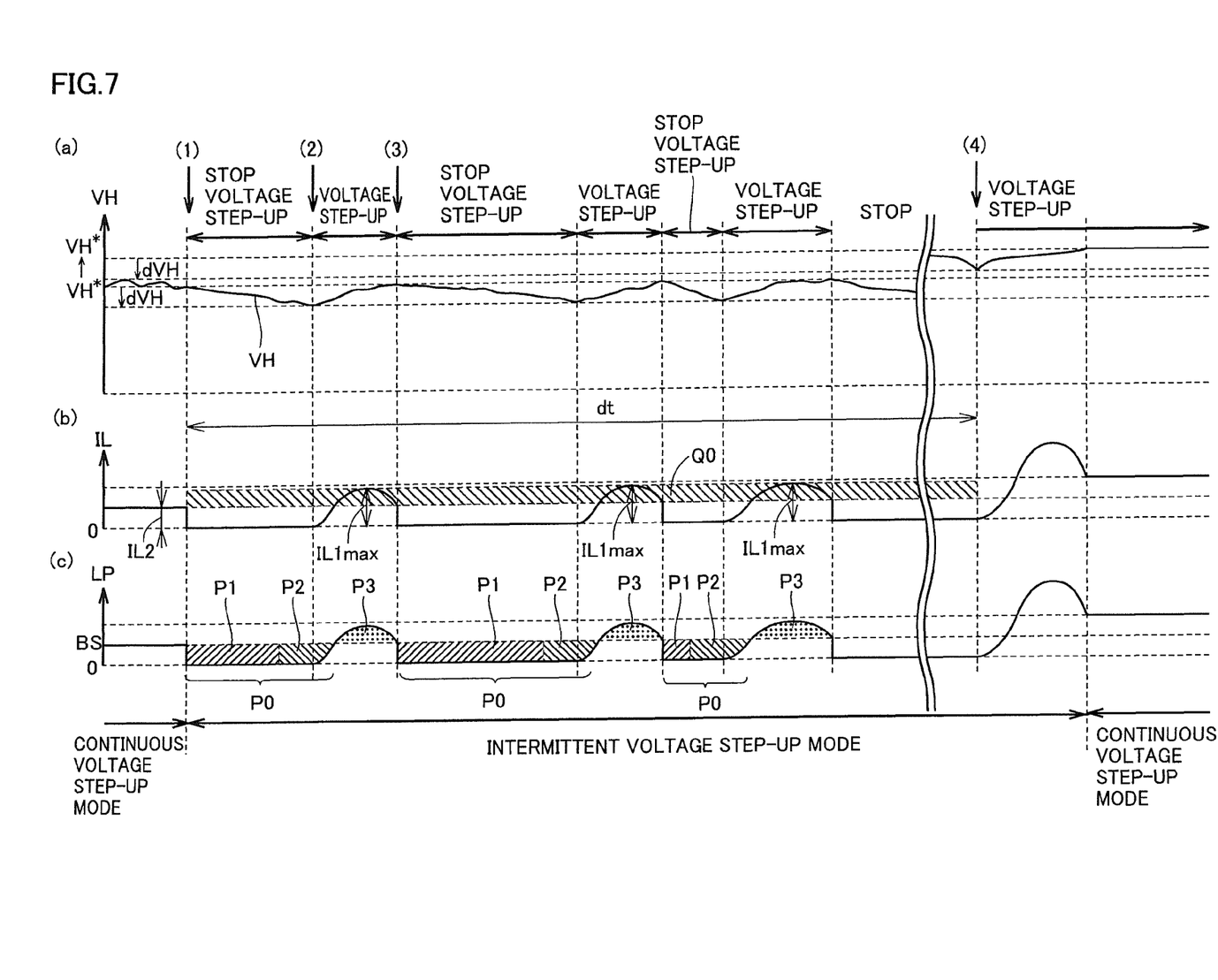
FIG. 7 is a waveform diagram for illustrating operations in a continuous voltage step-up mode and an intermittent voltage step-up mode.

FIG. 5 is a flowchart showing a procedure of voltage step-up control by converter 200. FIG. 7 is a waveform diagram for illustrating operations in the continuous voltage step-up mode and the intermittent voltage step-up mode.

FIG. 7 (a) is a chart showing output voltage (system voltage) VH of converter 200 in the continuous voltage step-up mode and the intermittent voltage step-up mode. FIG. 7 (b) is a chart showing reactor current IL in the continuous voltage step-up mode and the intermittent voltage step-up mode. Although reactor current IL is actually caused to vary by switching of converter 200, FIG. 7 (b) shows the reactor current whose varying component due to switching is smoothed. FIG. 7 (c) is a chart showing a voltage step-up power loss LP due to switching in the continuous voltage step-up mode and the intermittent voltage step-up mode.

Referring to FIGS. 2, 4, and 5, in step ST10, control device 500 sets converter 200 in the continuous voltage step-up mode. Converter 200 performs the voltage step-up operation without stopping the voltage step-up operation.

After this, when an average ILM of reactor current IL in a predetermined period in the past is less than a threshold value TH1 in step ST20, control device 500 causes the process to proceed to step ST25. In step ST25, control device 500 checks a battery condition in order to determine whether to permit the intermittent voltage step-up mode or not.

Figure 6:
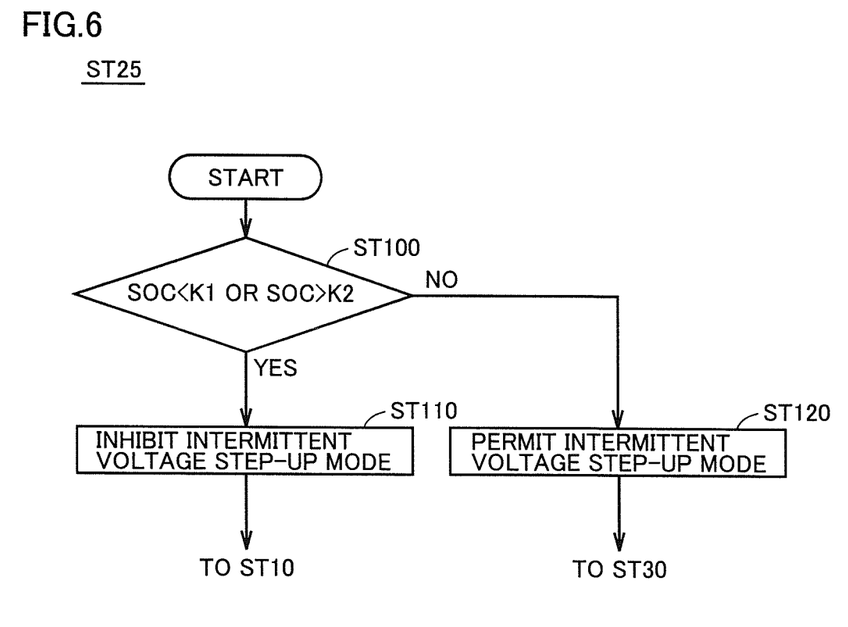
FIG. 6 is a flowchart showing details of step ST25 in the flowchart of FIG. 5.

FIG. 6 is a flowchart showing details of step ST25 of the flowchart in FIG. 5. Referring to FIGS. 2 and 6, in response to the start of the process of step ST25, control device 500 obtains battery current IB from battery sensor 152 and integrates battery current IB to thereby calculate an estimate value of the SOC of battery 150 in step ST100. Then, control device 500 determines whether or not the SOC of battery 150 falls in the permission range (the range between thresholds K1 and K2 in FIG. 4).

In the case where the SOC is out of the permission range in step ST100, control device 500 causes the process to proceed to step ST110 to determine that the intermittent voltage step-up mode is inhibited, and causes the process to return to step ST10 in the flowchart of FIG. 5. In this case, converter 200 is set in the continuous voltage step-up mode to operate.

In other words, as the estimate value of the SOC is closer to lower limit LL, control device 500 suppresses the operation of converter 200 in the intermittent voltage step-up mode to a greater extent. In the present embodiment, control device 500 suppresses the operation of converter 200 by inhibiting converter 200 from operating in the intermittent voltage step-up mode.

In contrast, in the case where the SOC falls in the permission range in step ST100, control device 500 causes the process to proceed to step ST120 to determine that the intermittent voltage step-up mode is permitted, and causes the process to proceed to step ST30 in the flowchart of FIG. 5. In this case, converter 200 is set in the intermittent voltage step-up mode to operate.

In step ST30, control device 500 sets converter 200 in the intermittent voltage step-up mode. In the case where the converter is set in the intermittent voltage step-up mode, control device 500 first causes the voltage step-up operation of converter 200 to be stopped (see time (1) in FIG. 7 for example). It should be noted that the voltage step-up operation may be stopped immediately after the converter is set in the intermittent voltage step-up mode or after a predetermined time has elapsed. As long as the condition in which voltage step-up is permitted and the condition in which voltage step-up is inhibited are repeated, this operation is included in the intermittent voltage step-up mode.

When the voltage step-up operation of converter 200 is stopped, current is not output from battery 150. Therefore, reactor current IL is zero and voltage step-up power loss LP is zero. While the voltage step-up operation of converter 200 is stopped, first MG 110 and/or second MG 120 are/is driven with electric power stored in capacitor C2. As electrical charge is discharged from capacitor C2, system voltage VH is decreased.

After this, when a deviation |VH*−VH| between system voltage VH and command voltage VH* is equal to or more than a limit value dVH in step ST40, control device 500 causes the process to proceed to step ST50. In step ST50, control device 500 causes converter 200 to restart the voltage step-up operation (see time (2) in FIG. 7 for example).

When the voltage step-up operation by converter 200 is restarted, battery 150 supplies current (recovery current) which is necessary to drive first MG 110 and/or second MG 120 while charging capacitor C2. Therefore, reactor current IL is increased and voltage step-up power loss LP is increased.

After this, when system voltage VH is equal to command voltage VH* in step ST60, control device 500 causes the process to proceed to step ST70. In step ST70, control device 500 causes the voltage step-up operation by converter 200 to be stopped (see time (3) in FIG. 7 for example). Following step ST70, the process is performed again from step ST40.

When average ILM of reactor current IL in a predetermined period in the past is larger than a threshold value TH2 in step ST80, control device 500 causes the process to proceed to step ST90 to set converter 200 in the continuous voltage step-up mode. Converter 200 performs the voltage step-up operation without stopping (see time (4) in FIG. 7 for example). At time (4) in FIG. 7, it is shown that command voltage VH* has been increased and reactor current IL begins to increase. After step ST90 is performed, the series of the process steps shown in FIG. 5 is ended.

FIG. 7 (c) shows by what amount voltage step-up power loss LP is reduced in a set of one period in which voltage step-up is stopped and one subsequent period in which voltage step-up is performed, in the intermittent voltage step-up mode. An area P3 of a region enclosed by a line which represents a reference power loss BS and a line which represents voltage step-up power loss LP and is located higher than the line of reference power loss BS is the sum of voltage step-up power losses LP larger than the voltage step-up power loss in the continuous voltage step-up mode. An area P0 of a region enclosed by the line which represents reference power loss BS and the line which represents voltage step-up power loss LP and is located lower than the line of reference power loss BS is the sum of voltage step-up power losses LP smaller than the voltage step-up power loss in the continuous voltage step-up mode. A value P1 determined by subtracting P2 (=P3) from P0 is the sum of reductions of the voltage step-up power loss, relative to the voltage step-up power loss in the continuous voltage step-up mode, achieved by the operation in the intermittent voltage step-up mode in the set of one period in which voltage step-up is stopped and one subsequent period in which voltage step-up is performed.

As shown in FIG. 7 (c), converter can be set in the intermittent voltage step-up mode to thereby reduce the voltage step-up power loss. A longer period in which the voltage step-up is stopped produces a greater effect of reducing the loss.

In step ST25, control device 500 determines whether to switch to the intermittent voltage step-up mode or not, depending on whether the SOC falls in the permission range (the range between threshold values K1 and K2 in FIG. 4) or out of the permission range. In the following, the reason why the permission range is defined will be described.

As shown in FIG. 4, threshold value K1 is defined to be larger by error dSOC than lower limit LL. Error dSOC may be considered as being given as a so-called margin in preparation for reduction of the precision with which the SOC is estimated in the intermittent voltage step-up mode. Namely, this margin can be provided to lower the possibility that control device 500 erroneously determines that the estimate value of the SOC is less than lower limit LL in spite of the fact that the true value of the SOC is lower limit LL or more. Accordingly, forced charging based on the erroneous determination can be prevented.

In contrast, threshold value K2 is defined to be smaller by error dSOC than upper limit UL. This error dSOC is also given as a margin. Therefore, the possibility can be decreased that control device 500 erroneously determines that the estimate value of the SOC is larger than upper limit UL in spite of the fact that the true value of the SOC is upper limit UL or less. Accordingly, forced discharging based on the erroneous determination can be prevented.

In this way, the range in which control in the intermittent voltage step-up mode is permitted can be limited by means of threshold values K1, K2 to thereby lower the possibility that forced charging or forced discharging is performed, even in the case where the precision with which the SOC is estimated is reduced under control in the intermittent voltage step-up mode. Accordingly, fuel economy can be improved and a user can be prevented from being caused to feel abnormal.

Next, how to determine error dSOC shown in FIG. 4 will be described. As described above, error dSOC is preferably a maximum error of the SOC that could occur under control in the intermittent voltage step-up mode. Namely, it is preferable that a maximum possible error is defined as the margin.

Between battery current IB, reactor current IL, and auxiliary machine current Idc, a relation: IB=IL+Idc holds. Auxiliary machine current Idc does not vary depending on the voltage step-up mode. Therefore, battery current IB1 in the intermittent voltage step-up mode and battery current IB2 in the continuous voltage step-up mode are expressed by the following formulas (1) and (2) respectively where IL1 is reactor current in the intermittent voltage step-up mode and IL2 is reactor current in the continuous voltage step-up mode.

$$IB1=IL1+Idc \qquad (1)$$

$$IB2=IL2+Idc \qquad (2)$$

As shown in FIG. 7, since reactor current IL2 in the continuous voltage step-up mode is constant, reactor current IL2 can be measured accurately. Therefore, when the measurement in the continuous voltage step-up mode is used as a reference, a maximum possible error in the measurement of battery current IB in the intermittent voltage step-up mode may occur as described below.

In the case where the continuous voltage step-up mode is used as a reference, an increase dIB of battery current IB in the intermittent voltage step-up mode is expressed by the following formula (3).

$$dIB=IB1-IB2=IL1-IL2 \qquad (3)$$

In the intermittent voltage step-up mode, reactor current IL1 changes with time, and a maximum increase of reactor current IL1 relative to reactor current IL2 is (IL1max−IL2) (see FIG. 7).

$$dIB \to IL1\text{max}-IL2 \quad (4)$$

(dIB is equal to or less than IL1max−IL2)

The amount of charge (unit: Ah) supplied from battery 150 is obtained by integrating measured battery current IB (unit: A) over a period (unit: h) of the intermittent voltage step-up mode. The amount of charge reaches its maximum in the case where respective timings at which battery current IB is measured match the timings at which reactor current IL1 has maximum value IL1max. Therefore, the maximum value of the amount of charge is expressed by (IL1max−IL2)×dt (indicated by an area Q0 in FIG. 7). It should be noted that dt is a period (the period between time (1) and time (4) in FIG. 7) taken for average ILM of reactor current IL to exceed threshold value TH2 in the intermittent voltage step-up mode.

Thus, error dSOC may be expressed by the following formula (5).

$$dSOC = (IL1\text{max}-IL2) \times dt/C0 \quad (5)$$

where C0 is a capacity C0 (unit: Ah) of battery 150. Namely, (IL1max−IL2)×dt is divided by capacity C0 to thereby convert the amount of charge to the SOC.

In this way, error dSOC can be determined to serve as a sufficient margin to thereby prevent forced charging or forced discharging which is done regardless of the fact that actually charging/discharging of battery 150 is unnecessary. It should be noted that the method of determining error dSOC is not limited to the above-described method.

Second Embodiment

The method of suppressing the operation of converter 200 in the intermittent voltage step-up mode is not limited to the method described above in connection with the first embodiment. In a second embodiment, the operation in the intermittent voltage step-up mode is suppressed by improving the precision with which battery current IB is measured.

An electrical system of a hybrid vehicle in the second embodiment has a configuration equivalent to the configuration of the electrical system in the first embodiment (see FIGS. 1 and 2). Therefore, the description thereof will not be repeated.

Referring again to FIG. 2, as described above in connection with the first embodiment, switching of switching elements Q1, Q2 in converter 200 in the intermittent voltage step-up mode is controlled based on a switching control signal from control device 500. A magnitude by which the voltage is stepped up per unit time by converter 200, namely an increase of system voltage VH per unit time (hereinafter also referred to as recovery rate (unit: V/s)) is determined depending on the ratio between an ON period of switching element Q1 and an ON period of switching element Q2. Namely, control device 500 can adjust the recovery rate by the switching control signal.

Figure 8:
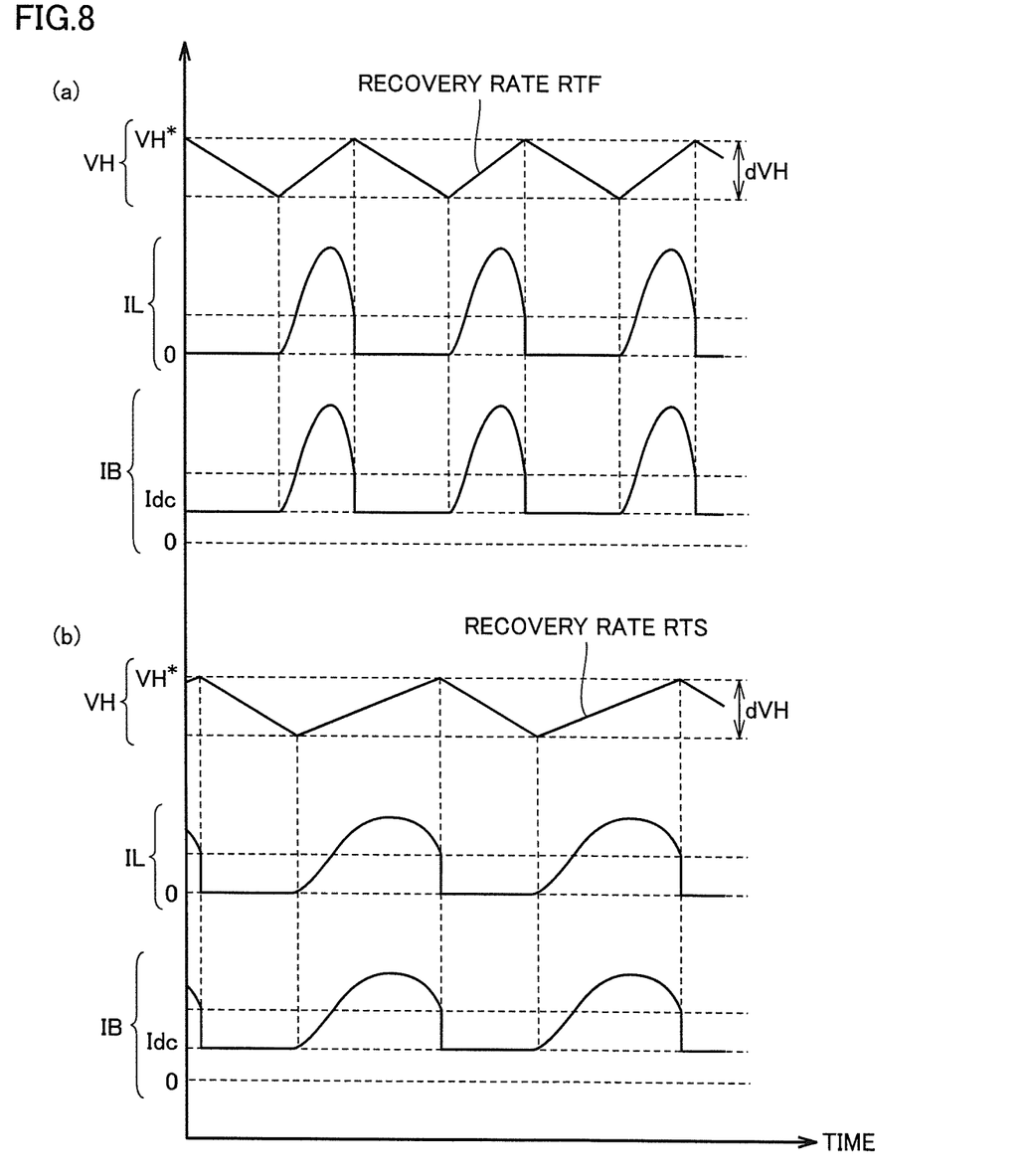
FIG. 8 is a diagram for comparison of battery current IB depending on a recovery rate.

FIG. 8 is a diagram for comparison of battery current IB depending on the recovery rate. The horizontal axis represents time axis. The vertical axis represents system voltage VH, reactor current IL, or battery current IB. Recovery rate RTS shown in FIG. 8 (b) is smaller than recovery rate RTF shown in FIG. 8 (a).

As shown in FIG. 8 (a), in the case where the recovery rate is large, reactor current IL sharply increases. Since battery current IB is determined by adding auxiliary machine current Idc (constant value in FIG. 8) to reactor current IL, a large recovery rate causes battery current IB to increase sharply. Since control device 500 measures battery current IB in longer cycles than cycles in which battery current IB varies, in FIG. 8 (a), the value of battery current IB obtained by control device 500 may be significantly different depending on the timing at which the battery current is measured.

In contrast, control device 500 in the second embodiment controls converter 200 using recovery rate RTS which is smaller as shown in FIG. 8 (b). In other words, control device 500 makes smaller the rate at which voltage VB of battery 150 is stepped up.

Accordingly, battery current IB increases gently and therefore battery current IB is averaged over time as compared with FIG. 8 (a). As a result, the variation of the value of battery current IB depending on the timing at which the battery current is measured can be reduced. The precision with which the SOC is estimated can thus be improved. Accordingly, forced charging or forced discharging which is actually unnecessary can be prevented.

Variation of Second Embodiment

In a variation of the second embodiment, control device 500 limits reactor current IL to a predetermined value or less. In other words, control device 500 limits current flowing through converter 200 in the intermittent voltage step-up mode to a predetermined value or less to thereby suppress the operation of converter 200.

Reactor current IL can be limited to a predetermined value or less by limiting the ratio between an ON period of switching element Q1 and an ON period of switching element Q2 within a certain range, similarly to the above-described adjustment of the recovery rate.

Limitation of reactor current IL to a predetermined value or less means that battery current IB is also limited to another predetermined value or less. Accordingly, a sharp increase of battery current IB is suppressed. Namely, as described above regarding FIG. 8 (b), battery current IB increases gently and therefore battery current IB is averaged over time. The precision with which the SOC is estimated can thus be improved. It should be noted that reactor current IL corresponds to "current flowing through the voltage step-up converter."

According to the foregoing description, the first and second embodiments and the variation of the second embodiment provide the control under which control in the intermittent voltage step-up mode is inhibited in the case where the SOC is out of a predetermined range, the control under which the recovery rate is made slower, and the control under which reactor current IL is limited, respectively. These controls, however, may also be combined as appropriate. These controls all correspond to implementations of "the control under which operation of the voltage step-up converter in the intermittent voltage step-up mode is suppressed."

Finally, referring again to FIGS. 1, 2, and 4, the present embodiments will be outlined. A power supply apparatus of a vehicle includes: engine 100 and first MG 110 (power generation unit); battery 150; converter 200 stepping up a voltage of battery 150 and supplying the stepped-up voltage to inverters 210, 220 (electrical load) of the vehicle; and control device 500 controlling converter 200 in the continuous voltage step-up mode and the intermittent voltage step-up mode. In the continuous voltage step-up mode converter 200 is continuously operated. In the intermittent voltage step-up mode converter 200 is intermittently operated. Control device 500 estimates the SOC of battery 150 based on battery current IB flowing into and out of battery 150, and forces battery 150 to be charged by engine 100 and first MG 110 when an estimate value of the SOC is lower than a predetermined lower limit LL. The control device suppresses an operation of converter 200 in the intermittent voltage step-up mode to a greater extent as the estimate value of the SOC is closer to lower limit LL.

Preferably, control device 500 suppresses the operation of converter 200 in the intermittent voltage step-up mode, in a case where the estimate value is equal to or smaller than threshold value K1 larger than lower limit LL.

Preferably, threshold value K1 is determined so that the threshold value is larger than lower limit LL by a maximum error dSOC of the estimate value of the SOC that can be caused by the operation of converter 200 in the intermittent voltage step-up mode.

Preferably, control device 500 suppresses the operation of converter 200 by inhibiting the operation of converter 200 in the intermittent voltage step-up mode.

Preferably, control device 500 suppresses the operation of converter 200 by reducing a rate at which voltage VB of battery 150 is stepped up in the intermittent voltage step-up mode.

Preferably, control device 500 suppresses the operation of converter 200 by limiting, to a predetermined value or less, reactor current IL of converter 200 in the intermittent voltage step-up mode.

Although the embodiments of the present invention provide the continuous voltage step-up mode and the intermittent voltage step-up mode, a continuous voltage step-down mode and an intermittent voltage step-down mode may be provided. Namely, MG-ECU 172 sets converter 200 in one of the continuous voltage step-down mode and the intermittent voltage step-down mode. In the continuous voltage step-down mode, converter 200 performs a voltage step-down operation without stopping. In the intermittent voltage step-down mode, converter 200 intermittently repeats a voltage step-down operation and stoppage of the voltage step-down operation. When converter 200 performs the voltage step-down operation, a period in which only switching element Q1 is ON and a period in which both switching elements Q1, Q2 are OFF are alternated. When converter 200 stops the voltage step-down operation, switching element Q1 is fixed in an ON state and switching element Q2 is fixed in an OFF state.

While the present embodiments have been described in terms of the hybrid vehicle, the present invention is applicable as well to a fuel cell vehicle. In this case, a fuel cell unit corresponds to "power generation unit."

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

100 engine; 110 first MG; 120 second MG; 112, 122 neutral point; 130 power split device; 131 sun gear; 132 ring gear; 133 pinion gear; 134 carrier; 135 ring gear shaft (driveshaft); 140 reduction gear; 150 battery; 152 battery sensor; 160 drive wheel; 170 PM-ECU; 172 MG-ECU; 180 voltage sensor; 200 converter; 210, 220 inverter; 230 SMR; 240 air conditioner; 500 control device; PL1, PL2 positive line; GL ground line; Q1-Q8 switching element; D1-D8 diode; C1, C2 capacitor; L reactor

The invention claimed is:

1. A power supply apparatus of a vehicle, comprising:
a power generation unit;
a power storage device;
a voltage step-up converter configured to step up a voltage of said power storage device and the voltage step-up converter configured to supply stepped-up voltage to an electrical load of the vehicle; and
a control device configured to control said voltage step-up converter in a continuous voltage step-up mode and an intermittent voltage step-up mode, in said continuous voltage step-up mode said voltage step-up converter being continuously operated, in said intermittent voltage step-up mode said voltage step-up converter being intermittently operated,
said control device being configured to estimate a state of charge of said power storage device based on current flowing into and out of said power storage device, and said control device being configured to instruct said power generation unit to charge said power storage device when an estimate value of said state of charge is lower than a predetermined lower limit,
said control device being configured to suppress an operation of said voltage step-up converter in said intermittent voltage step-up mode when said estimate value is equal to or smaller than a predetermined threshold value larger than said lower limit.

2. The power supply apparatus of the vehicle according to claim 1, wherein
said threshold value is determined such that said threshold value is larger than said lower limit by a maximum error of said estimate value that can be caused by said operation of said voltage step-up converter in said intermittent voltage step-up mode.

3. The power supply apparatus of the vehicle according to claim 1, wherein
said control device is configured to suppress said operation of said voltage step-up converter by inhibiting said operation of said voltage step-up converter in said intermittent voltage step-up mode.

4. The power supply apparatus of the vehicle according to claim 1, wherein
said control device is configured to suppress said operation of said voltage step-up converter by reducing a rate at which said voltage of said power storage device is stepped up in said intermittent voltage step-up mode.

5. The power supply apparatus of the vehicle according to claim 1, wherein
said control device is configured to suppress said operation of said voltage step-up converter by limiting, to a predetermined value or less, current flowing through said voltage step-up converter in said intermittent voltage step-up mode.

* * * * *